(12) United States Patent
Husar et al.

(10) Patent No.: US 10,999,361 B2
(45) Date of Patent: May 4, 2021

(54) CONSISTENT HASH-BASED LOAD BALANCER

(71) Applicant: RED HAT, INC., Raleigh, NC (US)

(72) Inventors: Radoslav Husar, Prague (CZ); Paul Marcus Ferraro, Boston, MA (US)

(73) Assignee: RED HAT, INC., Raleigh, NC (US)

( * ) Notice: Subject to any disclaimer, the term of this patent is extended or adjusted under 35 U.S.C. 154(b) by 6 days.

(21) Appl. No.: 16/125,445

(22) Filed: Sep. 7, 2018

(65) Prior Publication Data

US 2020/0084269 A1 Mar. 12, 2020

(51) Int. Cl.
*H04L 29/08* (2006.01)
*H04L 12/743* (2013.01)
*H04L 12/751* (2013.01)

(52) U.S. Cl.
CPC ...... *H04L 67/1027* (2013.01); *H04L 45/7453* (2013.01); *H04L 67/1014* (2013.01); *H04L 67/1023* (2013.01); *H04L 67/1029* (2013.01); *H04L 67/146* (2013.01); *H04L 45/02* (2013.01)

(58) Field of Classification Search
CPC ......... H04L 67/1002–1034; H04L 67/14–146; H04L 45/745–7453
See application file for complete search history.

(56) References Cited

U.S. PATENT DOCUMENTS

| 8,051,179 | B2 | 11/2011 | Angal et al. |
| 9,344,494 | B2 | 5/2016 | Mordani et al. |
| 9,672,123 | B2 | 6/2017 | Duggana et al. |
| 9,807,016 | B1* | 10/2017 | Sarangapani ......... H04L 47/125 |
| 9,830,235 | B1 | 11/2017 | Tong et al. |
| 10,182,033 | B1* | 1/2019 | Farhangi ............. H04L 61/1511 |
| 2009/0328054 | A1* | 12/2009 | Paramasivam ....... G06F 9/5033 718/105 |
| 2011/0069642 | A1* | 3/2011 | Karam ................ H04L 67/1008 370/260 |
| 2012/0239730 | A1* | 9/2012 | Revanuru ................ H04L 69/14 709/203 |
| 2012/0284296 | A1* | 11/2012 | Arifuddin ........... H04L 67/1027 707/769 |
| 2013/0013668 | A1* | 1/2013 | Kodaka ............... H04L 67/1004 709/203 |

(Continued)

FOREIGN PATENT DOCUMENTS

| CN | 107197035 A | 9/2017 |
| EP | 2887620 A1 | 6/2015 |
| EP | 2860637 B1 | 4/2017 |

OTHER PUBLICATIONS

Arodland Improving Load Balancing with a New Consistent-Hashing Algorithm,Vimeo Engineering Blog,Dec. 19, 2016, 5 pages.

*Primary Examiner* — Clayton R Williams
(74) *Attorney, Agent, or Firm* — Haynes and Boone LLP (57) ABSTRACT

Systems and techniques are disclosed for receiving, with a load balancer, a request from a client device. The request includes a session identifier corresponding to a session state associated with the request. The session state is stored on a first node within a cluster of nodes associated with the load balancer. A hash function is applied using the session identifier and topology information about the cluster of nodes. Based on a result of the hash function, a determination is made as to a selected node within the cluster of nodes to which the request is to be routed. The request is routed to the selected node.

20 Claims, 3 Drawing Sheets

(56) References Cited

U.S. PATENT DOCUMENTS

| | | | |
|---|---|---|---|
| 2014/0089387 A1* | 3/2014 | Chapman | H04L 29/0619 709/203 |
| 2015/0237155 A1* | 8/2015 | Power | H04L 67/2814 709/219 |
| 2016/0373520 A1* | 12/2016 | Kumar | H04L 67/14 |
| 2017/0163724 A1* | 6/2017 | Puri | H04L 67/2842 |
| 2017/0242762 A1* | 8/2017 | Feng | G06F 16/1774 |

* cited by examiner

CONSISTENT HASH-BASED LOAD BALANCER

FIELD OF DISCLOSURE

The present disclosure generally relates to network communications between networked applications, in particular to load balancing user data across multiple servers.

BACKGROUND

Web servers do not retain knowledge of variables used in past requests. Instead, web servers treat each web request as a new request. To store data about a user as the user navigates a web application, session states may be used. Session states enable variable values to persist for the duration of a session.

SUMMARY

A system of one or more computers can perform particular operations or actions by virtue of having software, firmware hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a method including: with a load balancer, receiving a request from a client device, the request including a session identifier corresponding to a session state associated with the request, the session state being stored on a first node within a cluster of nodes associated with the load balancer; applying a hash function using the session identifier and topology information about the cluster of nodes; determining, based on a result of the hash function, a selected node within the cluster of nodes to which the request is to be routed; and routing the request to the selected node.

One general aspect includes a computing system including: a non-transitory memory storing a code coverage module; one or more hardware processors coupled to the non-transitory memory and that execute instructions to cause the system to perform operations comprising: with a load balancer, receiving a request from a client device, the request including a session identifier corresponding to a session state associated with the request, the session state being stored on a first node within a cluster of nodes associated with the load balancer; applying a hash function using the session identifier and topology information about the cluster of nodes; determining, based on a result of the hash function, a selected node within the cluster of nodes to which the request is to be routed; and routing the request to the selected node.

One general aspect includes a non-transitory machine-readable medium having stored thereon machine-readable instructions executable to cause a machine to perform operations including: with a load balancer, receiving a request from a client device, the request including a session identifier corresponding to a session state associated with the request, the session state being stored on a first node within a cluster of nodes associated with the load balancer; applying a hash function using the session identifier and topology information about the cluster of nodes; determining, based on a result of the hash function, a selected node within the cluster of nodes to which the request is to be routed; and routing the request to the selected node.

DETAILED DESCRIPTION

This disclosure relates to network communications, and more particularly to load balancing. Methods, systems, and instructions stored on computer-readable media for performing load balancing using updated topology information are disclosed.

Multiple users may access a web application at any one time. Thus, to store persistent data for each user, usually at least as many session states are required as there are users accessing the web application. However, in reality, the number of session states and the number of requests for those session states is usually multiple times more than the number of users accessing the web application, because stateful web applications often create multiple copies of a user's session state distributed across multiple application servers.

To manage the multitude of requests and session states, web application deployments may apply load balancing techniques to distribute requests across a cluster of application servers. Such distribution and load balancing provide a degree of redundancy and efficiency, and ensures that a user's state is readily available to other nodes in the cluster. For example, if a node that originated a user session fails, any subsequent request for that user's session may be handled by another node in the cluster which also contains a copy of the user's state or session. Aside from failover circumstances, load balancing may also be used in high traffic or low accessibility scenarios to increase efficiency. For example, if one node is experiencing high traffic volumes, a load balancer may redirect requests to another node which also contains the user's state or session.

One way of keeping track of which node holds a user's session state is through session affinities. For example, where an application relies on server-side user states, load balancers may be configured to affiliate certain user sessions with particular nodes (often called session stickiness or session affinity). In some examples of sticky sessions, a load balancer may define the last server to have handled a given user's session as the server affiliated with that user's session. This affinity information may be encoded into an identifier that uniquely identifiers the user. For example, a user's identifier, "User A" may be affiliated with "Server A" by affinity information encoded into "User A"'s identifier. In other examples, a user "User B" may be associated with session identifier or session ID "Session B." Thus, the load balancer may search for the most recent server, "Server B," to have handled session ID "Session B," and direct requests for the "Session B" session ID to the server "Server B." Since the "Session B" session ID is associated with or unique to the user "User B," the load balancer succeeds in directing the request for User B's user session to a server that stores the user session, i.e., Server B.

However, when a node fails, or when user states are dynamically redistributed to rebalance loads within a cluster, affinity-based load balancers would reroute requests with either no information or outdated information of where the user's session is stored. For example, if the failed server was the server that was "affiliated" with the user session (e.g., it was the last server that handled the user's session), an affinity-based load balancer that simply relied on server affiliations to route requests would end up routing the request to the failed server. Such failed requests may trigger remote requests for the user state, which is costly as additional time, computing, and networking resources would need to be expended to access the remote user states. Further, if an affinity-based load balancer frequently redistributes user states, a significant percentage of requests would be routed to nodes that no longer contain the user session.

To overcome the shortcomings of affinity-based load balancers, especially in environments with widely-distributed user states, the described techniques employ a consistent hash function that requires two dynamic inputs: 1) cluster topology; and 2) session ID. Since the cluster topology used is always kept up-to-date, the load balancer would not route requests to unavailable nodes. And since the same (or consistent) hash function is used by both the nodes and the load balancer, the same hash result will be calculated by the nodes and the load balancer. This becomes important, for example, in a failover scenario, when the load balancer has to correctly route a request to a backup node after a primary node storing the user session has failed.

In more detail about the cluster topology, the cluster topology used by the hash function is kept up-to-date with any topology changes by, for example, opening a communication channel between the nodes and the load balancer. This communication channel allows the nodes to communicate any changes in the cluster topology to the load balancer as soon as the topology change occurs, or at least at the same time that the change is communicated to the rest of the nodes. In some examples, a node coordinator is appointed from the nodes in a cluster to notify the load balancer of the new cluster topology. Because the cluster topology is kept up-to-date in this way, the load balancer and the nodes will always calculate a consistent hash result and produce a consistent routing to an active node containing the user session without having to incur the additional overheads of maintaining routing information in the routing requests.

In more detail about how the current topology information and the consistent hash function may be used to replicate user sessions and locate replicated user sessions in a failover scenario, consider an example where a load balancer receives a request for a particular user session stored on a node. The load balancer may calculate a hash by passing in a session identifier extracted from the request and the current topology information. The topology information may also include information such as identifiers and activity status. For example, the topology information may reveal that nodes 1-4 are live. The topology information may further include the configuration of the nodes, e.g., primary node, secondary node, and so forth.

For example, node 1 may be the primary node storing the user's session state. Node 1 may use the consistent hash function to determine at which node it should create a backup or copy of the session state. For example, node 1 may input into the consistent hash function the session identifier for the stored session state and topology information simulating its own failure, e.g. {234}. The consistent hash function may return a result corresponding to node 3. Thus, if node 1 replicates the user session at node 3, in the event of an actual failure of node 1, the load balancer will correctly route requests to node 3 which contains the replicated session. This is because upon the failure of node 1, the load balancer will receive updated topology information, i.e., {234} from the node coordinator. Thus, the load balancer will also pass into the same hash function the same session identifier and the same topology information, {234}, which generates the same result corresponding to node 3. The same result is generated because the same hash function was used by the load balancer and node 1, i.e., a consistent hash function.

The disclosed techniques thus solve a problem encountered when using "sticky sessions" or session affinities described earlier. Instead of routing requests to a failed affiliated node, and having to perform a remote request for the user session, the disclosed techniques provide the updated topology information to the load balancer at the outset, and use a consistent hash function both to determine where to store backup session information and where the backup session has been stored, such that with just a single hash, a request can be accurately routed to a backup node in a failover scenario. Using the disclosed techniques, routing information need not be maintained on the client nor in requests or responses, since the load balancer can always determine a current route using current topology information.

Figure 1:
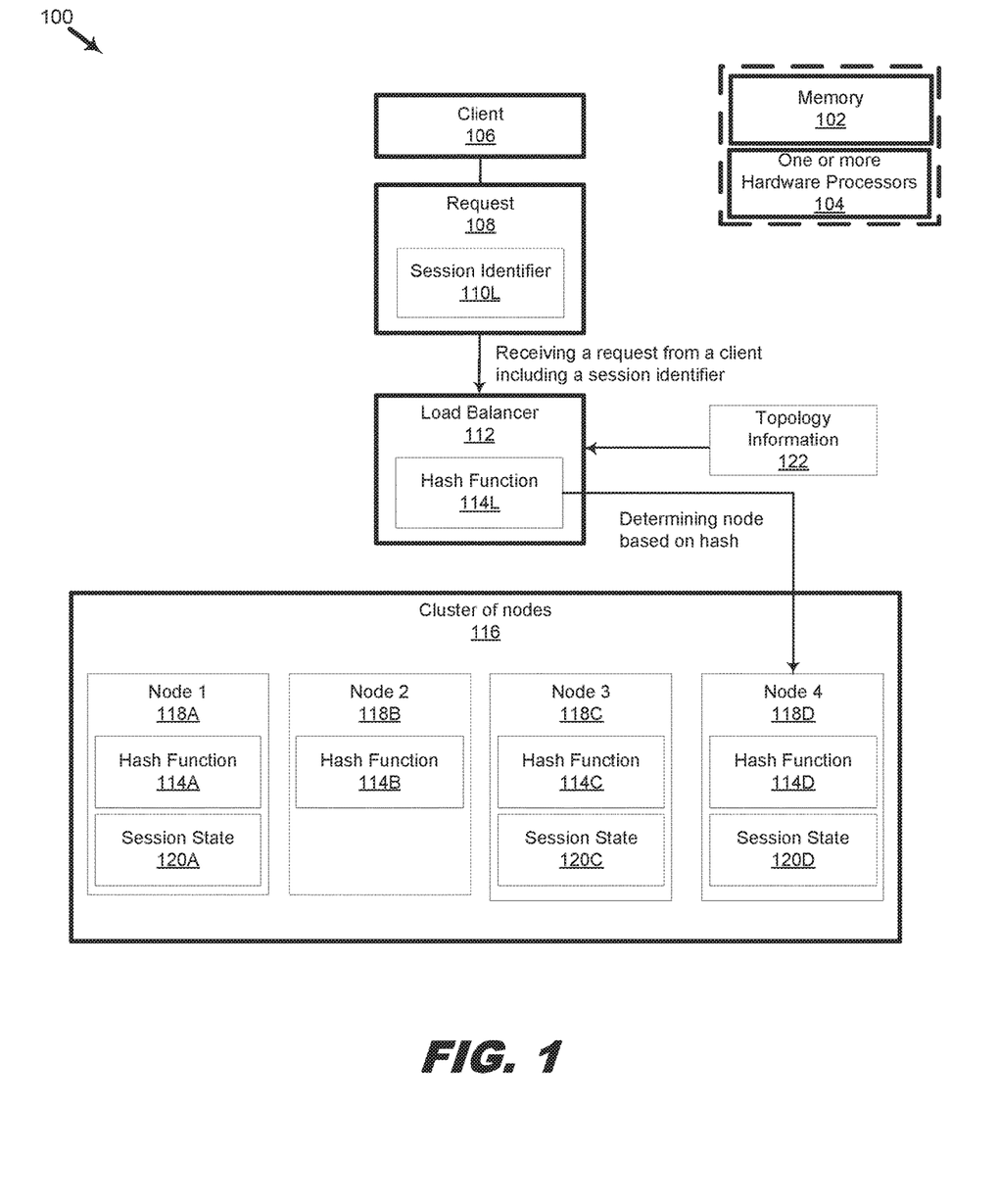
FIG. 1 is an organizational diagram illustrating a system 100 system to route a request to a node using a consistent hash function taking a session identifier and topology information as inputs, in accordance with various examples of the present disclosure.

FIG. 1 is an organizational diagram illustrating a system 100 system to route a request to a node using a consistent hash function taking a session identifier and topology information as inputs, in accordance with various examples of the present disclosure.

The system 100 includes memory 102 and one or more hardware processors 104. The memory 102 may be a non-transitory memory. The memory 102 may be structured to include at least one machine-readable storage medium on which is stored one or more set of instructions (e.g., software) including any one or more of the methodologies or functions described herein. The memory 102 may be structured to include one or more of a read-only memory (ROM), flash memory, dynamic random access memory (DRAM) such as synchronous DRAM (DFRAM), double data rate (DDR SDRAM), or DRAM (RDRAM), and so forth, static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in the memory 102 that are executable by the hardware processor 104.

In more detail regarding the hardware processor 104, the hardware processor 104 is structured to include one or more general-purpose processing devices such as a microprocessor, central processing unit (CPU), and the like. More particularly, the hardware processor 104 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the hardware processor 104 is structured to include one or more special-purpose processing devices such as an application specific integrated circuit (ASIC), a field programmable gate array (FPGA), a digital signal processor (DSP), network processor, and so forth. The hardware processor executes instructions for performing the operations, steps, and actions discussed herein.

The memory 102 is structured to store a request 108 from a client 106. The request may be a request for a user's session state, such as session states 120A, 120C, or 120D. The session states 120A, 120C, and 120D may be unique to the user. The request 108 may, for example, be a hypertext transfer protocol (HTTP) request, or any other type of computer instruction seeking use of or access to the session states 120A, 120C, and 120D. The request 108 may include a session identifier, 110L, which identifies the requested user session or user-specific state. One or more of the session states 120A, 120C, and 120D may correspond with the session identifier 110L. For example, session states 120A and 120D may both be sessions associated with the same user, thus both session states 120A and 120D may correspond with the session identifier 110L. In other words, sessions 120A and 120D may be copies of each other.

The load balancer 112 receives the request 108 and uses a hash function 114L to determine a destination node to which the request 108 should be routed. The hash function 114L may require one or more inputs to calculate a hash result. For example, a hash result may be calculated by inputting into the hash function 114L the session identifier 110L, which may be extracted from the request 108, and topology information 122, which may be received via a communication channel between the cluster 116 of nodes and the load balancer 112. Any hashing algorithm may be used in the hash function 114L. In some examples, non-cryptographic hash functions may be preferable to cryptographic hash functions, as non-cryptographic hash functions are quicker and cheaper to compute. Some examples of suitable non-cryptographic hash functions include: MUR-MURHASH; XXHASH; METROHASH; SEAHASH; and SIPHASH1-3. In some examples, the session identifier 110L and the topology information 122 are concatenated into a string before being passed into the hash function 114L. In some examples, the session identifier 110L and the topology information 122 are converted into binary code before being passed into the hash function.

In some examples, the hash function 114L is used in consistent hashing techniques to associate session states with the nearest node in a clockwise or counterclockwise direction on a hash ring. In some examples, the session identifier 110L and the topology information 122 are passed into hash function 114L, and the hash result is used to generate a value, position, or angle on the hash ring. Then, session states and nodes may be respectively assigned to different positions on the hash ring based on the hash result, and the session states may be associated with the nearest node in a clockwise or counterclockwise direction in the hash ring. In examples where nodes have been removed or have failed, consistent hashing techniques may be used to reassign session states to the next nearest node in a clockwise or counterclockwise direction on a hash ring, such that session states associated with failed nodes will be reassociated with the next nearest node, while session states associated with unfailed nodes will remain associated with the unfailed nodes. In some examples where nodes are added, consistent hashing techniques may be used to reassign session states to the next nearest node in a clockwise or counterclockwise direction on a hash ring, such that session states closest to the newly added nodes will be reassociated with the next nearest node, while session states that are closer to existing nodes will remain associated with the existing nodes. Thus, consistent hashing techniques may reduce the frequency with which session states need to be reassigned to different or new nodes when the network topology changes.

The topology information 122 includes information about a current topology of the cluster 116. In some examples, the topology information 122 may include an identifier of the nodes 118A-D, such as an internet protocol (IP) address of the node. In some examples, the topology information 122 may include current information about the status of the nodes 118A-D, for example, whether the nodes are active, suspended, full, disconnected, experiencing high traffic, dead, etc. The topology information 122 may include information about what session states 120A, 120C, and 120D are being stored on which nodes 118A-D. The topology information 122 may include information about the entire network of nodes, which may be comprised of multiple different clusters 116 of nodes, or may include information about only a single cluster 116 of nodes, or a combination of node clusters 116. In some examples, the cluster 116 of nodes includes only nodes that contain the session state corresponding to the requested session. In some examples, the cluster 116 of nodes also includes nodes that do not contain the session state corresponding to the requested session, such as node 2 118B of FIG. 1. The topology information 122 may be stored in any file format, and may be organized in any data structure such as a list, a table, an array, a tree, etc. In some examples, a node coordinator pushes the topology information 122 to the load balancer in response to any changes to the topology. In some examples, the topology information 122 is updated only when a node becomes unavailable or inaccessible, for example, when a node is deleted or experiences poor or interrupted network traffic.

By hashing the session identifier 110L and topology information 122, the load balancer 112 may determine one or more nodes in a cluster 116 of nodes to which to route the request 108. For example, when the hash function 114L hashes the session identifier 110L and the topology information 122, the hash result may indicate that the request 108 should be routed to node 4 118D. This may be because node 4 118D is the only node to return a matching hash result. For example, each of the session states 120A, 120C, and 120D in this example is different from the other, and each of the session states 120A, 120C, and 120D may be identified by their own unique session identifiers (e.g., "Alice," "Carol," and "David"). Each of the nodes 118A, 118C and 118D may use the its hash functions 114A, 114C, and 114D to hash identifiers of stored session states 120A, 120C, and 120D, i.e., "Alice," "Carol," and "David," with the topology information 122. Each of the hash results produced by the nodes 118A, 118C, and 118D may be unique and different from one another. If the session identifier 110L for the session in the request 108 is "David," then the result produced by the load balancer's 112 hashing of the session identifier 110L (i.e., "David") with the topology information 122 would match the result produced by node 118D when node 118D hashes the identifier of the session state 120D (i.e., "David") that happens to be stored in node 118D with the same topology information 122.

The nodes 118A-D may store hash results for each of its stored session states 120A, 120C, and 120D in a data structure, such as a hash table. Other types of data structures may be used, such as a list, a table, an array, a tree, etc. In some examples, the hash table is a data structure that implements an associative array abstract data type, which can map keys to values. In some examples, the hash table may compute an index into an array of buckets, from which a desired value can be found. The data structure may be updated by having each node 118A-D recalculate the hash results for its stored session states 120A, 120C, and 120D every time that the topology information 122 changes. Likewise, the load balancer 112, which is informed of changes to topology information 122 whenever they occur, also uses the updated topology information 122 to calculate its hash result. Thus, even if a topology change occurs, the load balancer 112 would still be able to determine a correct routing by, for example, comparing its hash result with the updated hash results in the hashing table. If a match is found at one of the nodes, the load balancer 112 may route the request to the matching node. In some examples, if more than one matching node is found (for example, if the session state has been duplicated in another node), the load balancer additionally applies load balancing logic, such as round-robin load balancing, to route the requests to the matching nodes in a load-balanced way. In other examples, the load balancer may always route the request to a node indicated as a primary node.

In some examples, only a subset of the topology information 122 is hashed. For example, only the topology information 122 associated with the requested session state may be passed into the hash function 114L. For example, if session states 120A, 120C, and 120D are copies of the same session state associated with session identifier 110L, the relevant subset of the topology information 122 may include information about node 1 118A, node 3 118C, and node 4 118D, but not node 2 118B. Thus, changes to the overall network, which would be captured in topology information 122 but do not impact the session states 120A, 120C, and 120D, would not affect the hash result. For example, the deletion of node 2 118B would constitute a change in topology information 122. Thus, ordinarily, a change in topology information 122 would trigger a recalculation of hash results. But since node 2 118B does not contain any session states (as illustrated), or more generally does not contain any session states that are in common with the session states stored in the other nodes 118A, 118C, and 118D, the deletion of node 2 118B would not change the routing of any requests for the session states stored in the other nodes 118A, 118C, and 118D. In other words, in the subset of the topology information 122 that is relevant to session states 120A, 120C, and 120D, there has effectively been no change to the topology information 122. Thus, not all topology changes require a recalculation of hash results.

The hash result may appear to be a long string of seemingly random numbers, letters, and symbols. Nevertheless, the hash result may be used to uniquely identify a node 118A-D in the cluster 116 of nodes. In some examples, the node identifier may be associated with an address of the node 118A-D, such as an internet protocol (IP) address of the node 118A-D. In some examples, the load balancer 112 looks up the hash result in a data structure to determine the node 118A-D and/or the address of the node 118A-D to which to route the request. In some examples, the data structure containing the hash results and the addresses is stored locally to the load balancer 112. In other examples, the data structure is stored remotely from the load balancer 112.

In FIG. 1, cluster 116 is illustrated as including four nodes: node 1 118A; node 2 118B; node 3 118C; and node 4 118D. Each of the nodes 118A-D uses the same hash function 114A-D as hash function 114L, and each of the nodes 118A-D uses the same hash function as each of the other nodes 118A-D. For example, the hash function 114A used by node 1 118A is the same as hash function 114B used by node 2 118B; the hash function 114B used by node 2 118B is the same as hash function 114C used by node 3 118C; and so forth. Each of the nodes 118A-D also uses the same hash function inputs, i.e., the session identifier 110L and topology information 122. Since the same hash function 114A-D is used, the nodes 118A-D produce the same hash result as the load balancer 112. In other words, the nodes 118A-D and the load balancer 112 use a consistent hash function to produce a consistent hash result. Each node 118A-D and the load balancer 112L may store its own hash functions 114L, 114A-D locally, or they may remotely access hash functions 114L, 114A-D, for example, from a common server. In some examples, a combination of local and remote access is used.

Figure 2:
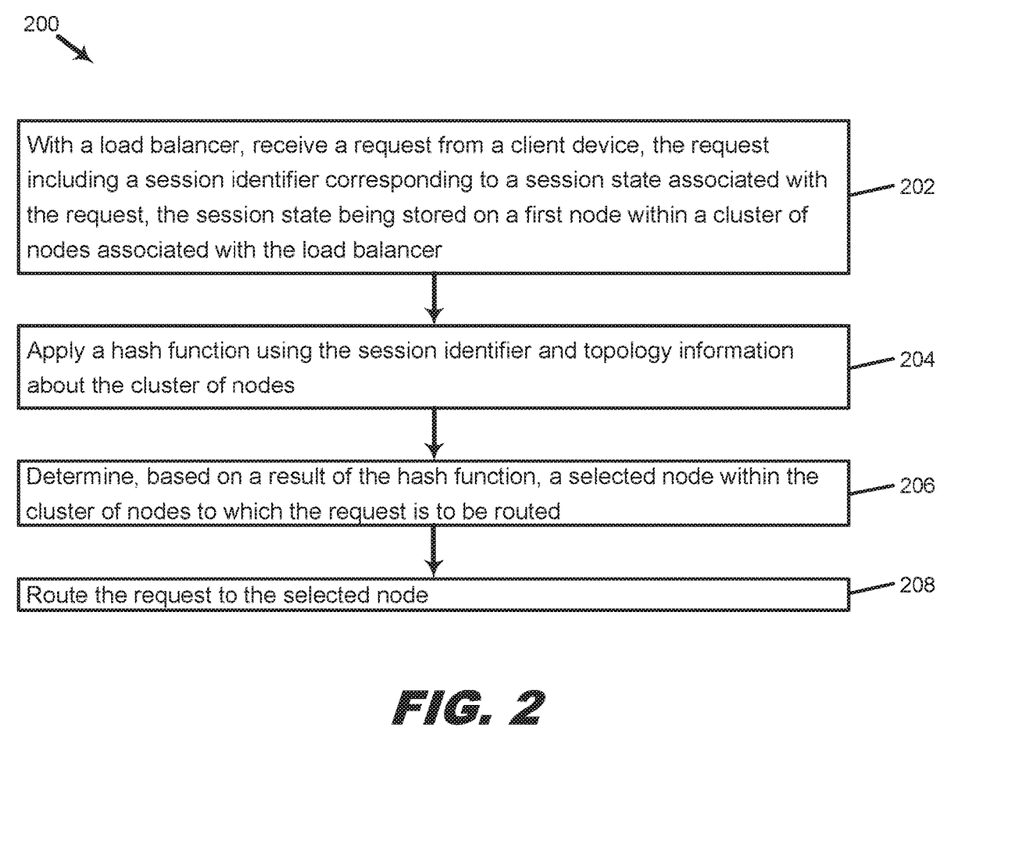
FIG. 2 is a flow diagram illustrating a method 200 system to route a request to a node using a consistent hash function taking a session identifier and topology information as inputs, in accordance with various examples of the present disclosure.

FIG. 2 is a flow diagram illustrating a method 200 system to route a request to a node using a consistent hash function taking a session identifier and topology information as inputs, in accordance with various examples of the present disclosure. Method 200 may be performed by executing computer-readable instructions that are stored in memory 102 using one or more hardware processors 104 described with respect to FIG. 1. Additional actions may be provided before, during, and after the steps of method 200, and some of the actions described may be replaced, eliminated and/or re-ordered for other examples of the method 200. For example, method 200 may be performed in conjunction with systems 100 and 300 described with respect to FIGS. 1, 3A, and 3B.

At action 202, a load balancer receives a request from a client device. The client device may include hardware electronic devices, as well as software applications, programs, cloud platforms, etc. The load balancer may receive the request directly from the client device, or indirectly through intermediary servers. In both cases, the request would be considered as being "received from a client device," as the request originated from or was triggered at some point by a client device.

For example, a user may perform an online banking transaction by accessing an online banking application on his or her smart phone. But before the user may perform the transaction, the user may be presented with a login screen, at which he or she enters his or her password. If the correct authentication credentials are presented, a request to create a session state for the user may be received by the web application, and the user's session state may be set to "successful." If the web application has multiple servers or nodes, a load balancer may be used to determine at which node a new session state for the user should be created and stored.

Suppose the user correctly logs in and a successful session state has been created. Sometime later, the user may, for example, request to transfer money between accounts. Such a request may, for example, require the web application to determine if the user's session state is still active, and perform the requested transaction only if the user's session state is still active. If the web application has stored or duplicated the user's session state across multiple nodes, the load balancer would have to determine the node or nodes at which the user's session state is stored, so that the load balancer can correctly route the request. While two banking requests are described here, the load balancer may receive any number, and any type of request.

As described with respect to session identifier 110L of FIG. 1 above, the request may include a session identifier. The session identifier may uniquely identify the session state that is associated with or is the subject of the request. As described with respect to session states 120A, 120C and 120D, the requested session state or states may be stored in a node, such as nodes 118A-D, and the nodes may be arranged in a cluster 116. The nodes may be associated with or accessible by the load balancer, for example, via a wired or wireless local area network or the internet.

At action 204, a hash function is applied using the session identifier and the topology information about the cluster of nodes. The topology information may be current information about the nodes received from a node coordinator. Thus, the point of communication between the load balancer and the nodes may be a single point of communication, i.e., the node coordinator. The topology information may include information about all of the nodes in the cluster, or a relevant subset of the nodes that contain the requested session state. Likewise, the cluster may include only the nodes that have the requested session states, or may include other nodes as well that do not have the requested session states. For example, the cluster may include all of the servers in a server rack, geographic region, etc.

At action 206, the node to which the request should be routed is determined based on a result of the hash function. The hash function may produce a unique result that may be associated with a node. For example, the node may be identified by a unique string of characters produced by a hash function. The hash results may be produced by hashing, using the same hash function used by the load balancer, the identifiers of session states stored on the node with the topology information. Thus, a node storing multiple session states would generate a unique hash result for each of its session states. If only one of the node's hash results matches with the hash result of the load balancer, the load balancer may immediately route the request to the matching node. If multiple nodes in a cluster have matching results, the load balancer may select a node to which the request should be routed based on load balancer logic. For example, load balancer logic may be applied to evenly distribute requests for existing sessions across the various nodes, or to create new sessions evenly across the nodes. Load balancer logic may also be applied to direct requests in the most efficient manner (e.g., select the node which provides the fastest access times for the request), or in the most economical manner (e.g., select the node which costs the least networking resources), or to a preferred node (e.g., a primary node).

At action 208, the load balancer routes the request to the selected node. The load balancer may determine the routing address of the selected node from a routing table. The routing table may include an IP address, a port number, a uniform resource identifier (URI), or any other suitable routing information corresponding to the selected node usable to route data to the selected node directly or indirectly, e.g., via intermediate nodes.

Figure 3A:
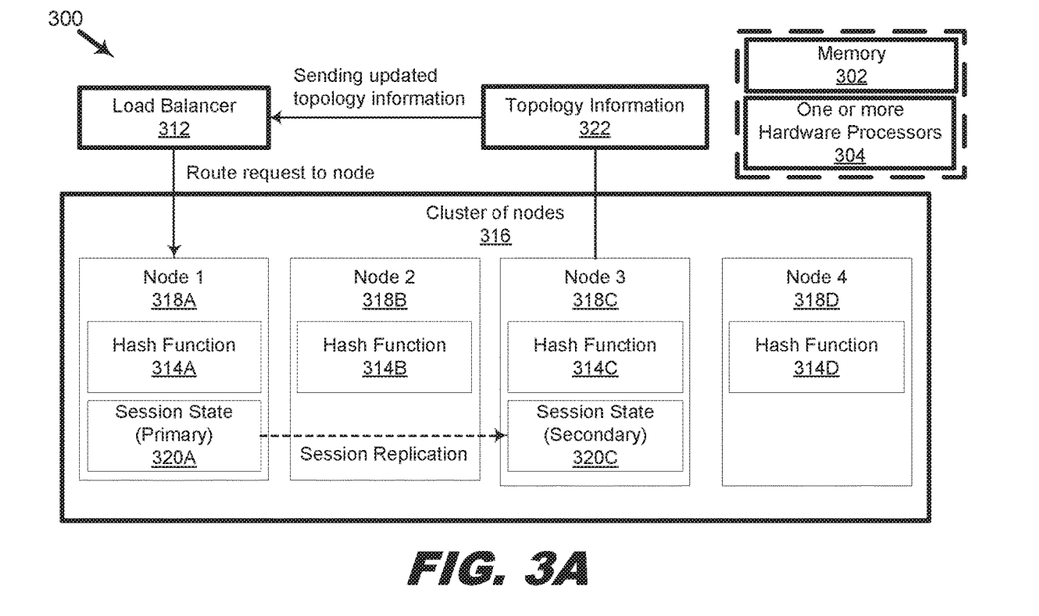
FIG. 3A is an organizational diagram illustrating a system 300 to replicate a session state from one node to another, in accordance with various examples of the present disclosure.

FIG. 3A is an organizational diagram illustrating a system 300 to replicate a session state one node to another, in accordance with various examples of the present disclosure.

System 300 includes memory 302 and one or more hardware processors 304 similar to those described with respect to FIG. 1. The one or more hardware processors 304 execute instructions for performing the operations, steps, and actions discussed herein. The memory 302 may be structured to store session states 320A and 320C. Session state 320A may be a primary session state, and session state 320C may be a secondary session state. Session state 320C may be a copy of session state 320A. The copying may be done as part of a replication process to distribute session states across multiple nodes. Thus, session 320A, which is stored in node 1 318A, may be replicated and stored in node 3 318C. Such a distribution of session states across multiple nodes may be used to increase reliability by adding redundancy, or increase efficiency by allowing the servers with the fastest access and processing times to serve the client requests, for example, if node 3 318C is faster than node 1 318A. The following describes the replication of session states in more detail.

Node 1 may use the hash function 314A to determine at which node 318B-318D session state 320A should be replicated. In some examples, node 1 318A assumes its own failure and inputs into the hash function 314A the identifier for the session state 320A and the topology information 322 simulating the failure of node 1 318A. The result of the hash may be an identifier corresponding to node 3 318C. Accordingly, node 1 318A may copy session state 320A into node 3 318C. The copied session state may be stored as session state 320C in node 3 318C. While only one session state 320A is shown in FIG. 3, the same process may be repeated for each of the session states stored in node 1 318A. Thus, a first session state may be copied and stored in node 3 318C, while a second session state may be copied and stored in node 2 318B, a third session state may be copied and stored in node 4 318D, and a fourth session state may be copied and stored in a node outside of cluster 316.

Since two identical session states 320A and 320C exist, one of the session states 320A and 320C may be designated as the primary session state, with the other designated as the secondary session state. As illustrated, session state 320A is designated primary, while session state 320C is designated secondary. The designation may help a load balancer 312 to decide whether to route a request for the identical session states 320A and 320C to node 1 318A or node 3 318C. In some examples, the load balancer 312 may include a load balancing logic or policy which preferentially routes requests to the node containing the primary session state.

After a session state has been replicated in another node, the topology information 322 may be updated. In some examples, the source node, i.e., node 1 318A, updates the topology information 322. In some examples, the target node, i.e., node 318C, updates the topology information 322. In some examples, either the source node or the target node informs the node coordinator of the replication, and the node coordinator updates the topology information 322. Assuming that node 3 318C is the node coordinator, node 3 318C may both update the topology information 322 and send the updated topology information 322 to the load balancer 312.

The node coordinator may announce updated topology information 322 to the nodes 318A-D in the cluster 316 and to the load balancer 312. In response, the nodes 318A-D in the cluster 316 may recalculate their hash results based on the updated topology information 322 and the identifiers of any session states stored in the nodes 318A-D. The hash results may be updated to a data structure that is accessible by the load balancer 312. Similarly, the load balancer 312 also uses the updated topology information 322 and the session identifier in the request to calculate a hash result. For example, the session identifier may be for session state 320A. Since session state 320C is a copy of session state 320A, the identifier of session state 320C may be the same as that of session state 320A. Thus, the load balancer may find that its hash result matches with the hash result of both node 1 318A and node 3 318C. Since more than one node in the cluster 316 is a valid target to route the request (as they both contain the requested session state 320A), the load balancer 312 may apply load balancing logic to determine which of the two nodes 318A and 318C should receive the request. FIG. 3 shows an example where the load balancer 312 routes the request to the node containing the primary session state, i.e., node 1 318A.

In some examples, topology information 322 is not updated when session states are replicated. This reduces the number of topology changes and the number of recalculations of hashes, which saves computing and networking resources. However, topology information 322 may be updated if a node fails. For example, if topology information 322 is not updated when session state 320A is copied to node 3 318C, the load balancer 312 would not know that a copy of the session state 320A exists outside of node 1 318A. Thus, the load balancer 312 will continue to route requests to node 1 318A in all circumstances. However, when node 1 318A fails, the node coordinator is made aware of the failure (e.g., by group communication), updates the topology information 322, and sends the updated topology information 322 to the load balancer 312. In response to receiving updated topology information 322, the load balancer 312 then recalculates its hash result by hashing the updated topology information 322 and the session identifier corresponding to session state 320A. The load balancer 312 arrives at the same hash result and the same node as determined by node 1 318A when it was deciding where to store a copy of session state 320A before it failed: node 3 318C.

Figure 3B:
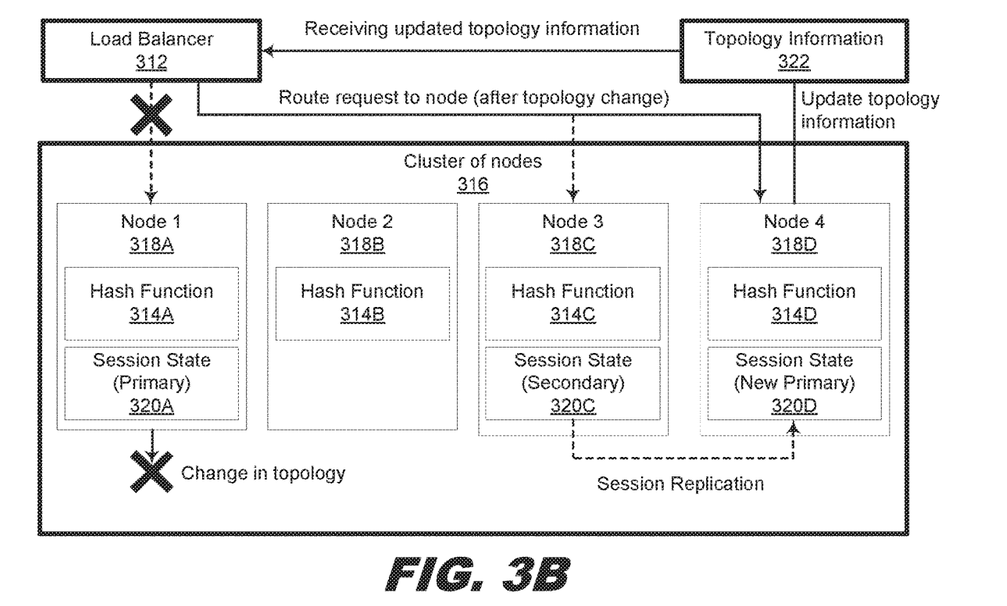
FIG. 3B is an organizational diagram illustrating a system 300 to replicate a replicated session state to another node, in accordance with various examples of the present disclosure.

FIG. 3B is an organizational diagram illustrating a system 300 to replicate a replicated session state to another node, in accordance with various examples of the present disclosure.

System 300 includes memory 302 and one or more hardware processors 304 similar to those described with respect to FIG. 1. The one or more hardware processors 304 execute instructions for performing the operations, steps, and actions discussed herein. The memory 302 may be structured to store one or more of session states 320A, 320C, and 320D. Session state 320A may be a primary session state. As described with respect to FIG. 3A, session state 320A, which may be the primary session state, may become inaccessible due to the deletion (or other inaccessibility event) of node 1 318A. However, session state 320C, which may be the secondary session state, may still remain accessible. A new session state, session state 320D, may be copied from session state 320C. The session state 320D may be set as the new primary session state, with session state 320C remaining as the secondary session state. The following describes the replication of session states after a node has become inaccessible in more detail.

Like in FIG. 3A, FIG. 3B shows a cluster 316 of nodes including four nodes, nodes 1-4 318A-318D. Each node has access to a consistent hash function, 314A-D. Assume an initial state in FIG. 3B where node 1 318A stores the session state 320A, and node 3 318C stores the session state 320C. In some examples, session state 320C may be a copy of session state 320A, and may have been copied as a result of the replication process described with respect to FIG. 3A. In some examples, session state 320A may be a primary session state, and session state 320C may be a secondary session state.

At some later point in time, node 1 318A fails, becomes practically inaccessible, or becomes less efficient in serving requests for session state 320A than node 3 318C. Each of these events may be considered a change in topology, and be recorded in topology information 322. The load balancer 312 may receive the updated topology information 322 via a node coordinator, and may rehash the updated topology information 322 with the same session identifier corresponding to session state 320A. The recalculated hash result may match with the hash results of node 3 318C, since node 3 318C contains the copy of the session state 320A, i.e., session state 320C. As earlier explained, node 3 318C may or may not have recalculated its hash result, depending on the extent of the change in topology.

Based on the hash match, the load balancer 312 may direct the request for session state 320A to node 3 318C. Additionally, in response to the failure of node 1 318A, the session state 320C may be replicated to another node. The same replicating techniques that were used to replicate session state 320A from node 1 318A to node 3 318C earlier described with respect to FIG. 3A may be used to replicate session state 320C from node 3 318C to node 4 318D. In some examples, the session state 320C may be designated as the primary session state, and the session state 320D may be designated as the secondary session state. In some examples, such as shown in FIG. 3B, the session state 320C may remain as the secondary session state, and the session state 320D may be designated as the (new) primary session state. In response to being designated as the primary session state, the node coordinator or the designated node may update the topology information 322. The node coordinator or the designated node may provide the updated topology information 322 to the load balancer 312. Based on the updated topology information, the load balancer may route the request to the designated primary node. Thus, the load balancer 312 may route the request to node 4 318D.

In some examples, the load balancer 312 hashes session state priority status as part of hashing the topology information 322. For example, only primary session state status, but not secondary session state status, may be included in the hash. As a result, primary session states may produce a unique hash result. In some examples, if the load balancer 312 hashes session state priority status, so too would the nodes. For example, if the load balancer 312 hashes session state priority status as part of hashing the topology information 322, node 3 318C and/or node 4 318D would also input into their respective hash functions 314C and/or 314D: (1) a session identifier corresponding to their respective stored session states 320C and/or 320D; and (2) topology information 322 which includes the priority designation of the session states 320C and 320D. Thus, even though the identifier of session state 320C may be identical to the identifier of session state 320D, the hash results would differ since the session state's priority designation is also hashed as part of topology information 322. In other words, the result of a hash of topology information 322 with session state 320C, which is a secondary session state, would differ from that involving session state 320D, which is a primary session state.

After the hash results have been obtained, the data structure may be updated by the nodes or by the node coordinator. Thus, when the load balancer 312 recalculates its hash result passing in only primary session states, the load balancer 312 would find in the data structure that only the result provided by node 4 318D matches. The request would therefore be routed to node 4 318D containing the primary session state.

In some examples, session states that are not replicated are marked by default as primary session states.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
   with a load balancer, receiving a request from a client device, the request including a session identifier corresponding to a session state associated with the request, the session state being stored on a first node within a cluster of nodes associated with the load balancer;
   applying a hash function using the session identifier and topology information about the cluster of nodes, the topology information including node configuration information about each node within the cluster of nodes and current information about the status of each node within the cluster of nodes and a priority designation status about at least one node session state corresponding to at least one node within the cluster of nodes, wherein the node configuration information indicates that at least one node within the cluster of nodes is a primary node;
   determining, based on a result of the hash function, a selected node within the cluster of nodes to which the request is to be routed; and
   routing the request to the selected node.

2. The method of claim 1, further comprising receiving updated topology information from one of the nodes within the cluster of nodes in response to a change in a topology of the cluster of nodes.

3. The method of claim 2, wherein the one node of the cluster of nodes includes a node coordinator.

4. The method of claim 3, further comprising, with the node coordinator, pushing updated topology information to the load balancer in response to the topology change.

5. The method of claim 1, further comprising replicating the session state from the first node that stores a second state to a second node that stores a replicated session state.

6. The method of claim 5, wherein a change in a topology of the cluster of nodes is caused by inaccessibility to the session state stored in the first node.

7. The method of claim 6, further comprising replicating the session state from the second node to a third node within a cluster of nodes in response to the change in topology.

8. The method of claim 7, further comprising setting the third node as the primary node for the session state.

9. The method of claim 8, wherein the topology information is updated after the replicating the session state from the second node to the third node and after the setting the third node as the primary node.

10. The method of claim 9, wherein the topology information, after being updated, includes node configuration information identifying the third node as the primary node and identifying the second node as a secondary node.

11. A system comprising:
    a non-transitory memory storing a code coverage module;
    one or more hardware processors coupled to the non-transitory memory and that execute instructions to cause the system to perform operations comprising:
      with a load balancer, receiving a request from a client device, the request including a session identifier corresponding to a session state associated with the request, the session state being stored on a first node within a cluster of nodes associated with the load balancer;
      applying a hash function using the session identifier and topology information about the cluster of nodes, the topology information including node configuration information about each node within the cluster of nodes and current information about the status of each node within the cluster of nodes and a priority designation status about at least one node session state corresponding to at least one node within the cluster of nodes, wherein the node configuration information indicates that at least one node within the cluster of nodes is a primary node;
      determining, based on a result of the hash function, a selected node within the cluster of nodes to which the request is to be routed; and
      routing the request to the selected node based on the hash function.

12. The system of claim 11, wherein the determining the selected node includes looking up a matching hash result.

13. The system of claim 12, wherein the matching hash result is provided by the selected node.

14. The system of claim 13, wherein the selected node provides the matching hash result to a data structure.

15. The system of claim 14, wherein the data structure is a hash table.

16. A non-transitory machine-readable medium having stored thereon machine-readable instructions executable to cause a machine to perform operations comprising:
    with a load balancer, receiving a request from a client device, the request including a session identifier corresponding to a session state associated with the request, the session state being stored on a first node within a cluster of nodes associated with the load balancer;
    applying a hash function using the session identifier and topology information about the cluster of nodes, the topology information including node configuration information about each node within the cluster of nodes and current information about the status of each node within the cluster of nodes and a priority designation status about at least one node session state corresponding to at least one node within the cluster of nodes, wherein the node configuration information indicates that at least one node within the cluster of nodes is a primary node;
    determining, based on a result of the hash function, a selected node within the cluster of nodes to which the request is to be routed; and routing the request to the selected node based on the hash function, wherein the selected node is the first node.

17. The non-transitory machine-readable medium of claim 16, further comprising receiving updated topology information from one of the nodes within the cluster of nodes in response to a change in a topology of the cluster of nodes.

18. The non-transitory machine-readable medium of claim 17, wherein the determining the selected node is repeated in response to the change in the topology of the cluster of nodes.

19. The non-transitory machine-readable medium of claim 17, wherein the change in the topology of the cluster of nodes does not affect accessibility to the session state stored on the selected node.

20. The non-transitory machine-readable medium of claim 19, wherein based on the change in the topology not affecting accessibility to the session state stored on the selected node, the determining the selected node is not repeated in response to the change in the topology of the cluster of nodes.

* * * * *